United States Patent [19]

Yamamura et al.

[11] 4,294,116
[45] Oct. 13, 1981

[54] TEMPERATURE DETECTING CIRCUIT

[75] Inventors: Keizo Yamamura, Nagaokakyo; Yasuo Ohashi, Kyoto, both of Japan

[73] Assignee: Omron Tateisi Electronics Co., Kyoto, Japan

[21] Appl. No.: 130,435

[22] Filed: Mar. 14, 1980

[51] Int. Cl.³ .............................................. G01K 7/20
[52] U.S. Cl. ............................................... 73/362 AR
[58] Field of Search .................. 73/362 AR; 324/105

[56] References Cited

U.S. PATENT DOCUMENTS

| | | | |
|---|---|---|---|
| 3,754,442 | 8/1973 | Arnett | 73/362 AR |
| 3,783,692 | 1/1974 | Hansen | 73/362 AR |
| 3,805,616 | 4/1974 | Sugiyama | 73/362 AR |
| 3,880,006 | 4/1975 | Poduje | 73/362 AR |

FOREIGN PATENT DOCUMENTS 962088  2/1975  Canada ......................... 73/362 AR

*Primary Examiner*—Donald O. Woodiel
*Attorney, Agent, or Firm*—Wegner & Bretschneider

[57] ABSTRACT

A temperature detecting circuit comprising a three-wire temperature sensor module including a temperature responsive resistance, three cable leads and first, second and third terminals connected to the three leads, a reference voltage source having first and second power terminals, said first terminal being connected to the first power terminal, a first resistance connected across said third terminal and second power terminal, a second and a third resistance connected in series across said second terminal and said second power terminal, a potential divider being connected across the first and second power terminals and having a movable contact, and an adder which sums a first voltage appearing at a junction between the third terminal and said first resistance, a second voltage appearing at a junction between said second and third resistances and a third voltage appearing on said movable contact and generates an output signal when said temperature responsive resistance senses a detection temperature and said movable contact is positioned to a point corresponding to the detection temperature.

6 Claims, 2 Drawing Figures

TEMPERATURE DETECTING CIRCUIT

BRIEF SUMMARY OF THE INVENTION

The present invention relates to a temperature detecting circuit comprising a temperature responsive resistance and three cable leads connected to the temperature responsive resistance, and more particularly to an improved temperature detecting circuit for providing an accurate temperature detection independently of the length of said three cable leads.

A temperature detecting circuit is well known which comprises a three-wire temperature sensor consisting of a temperature responsive resistance and three cable leads connected to the resistance so as to avoid the influence of internal resistance of the three cable leads. In FIG. 1, there is shown such a well known temperature detecting circuit which comprises a temperature sensor module 14 and its associated circuit 15. The module 14 is removably connected to the circuit 15 through three terminals 1, 2 and 3. The three cable leads 11, 12 and 13 having equivalent internal resistance value $r_e$ are connected, at one end of each thereof, to the terminals 1, 2 and 3, respectively, and, at the other ends, to the temperature responsive resistance 10. The terminal 1 is connected to a reference voltage source 5. The terminal 2 is connected to a series circuit consisting of a resistance 22 and a variable resistance 23. The variable resistance 23 is for presetting a detection temperature. The terminal 3 is connected to a positive input terminal of a comparator 4 and to a resistance 21 having a resistance value equivalent to that of the resistance 22. A junction 6 between resistances 22 and 23 is connected to a negative input terminal of the comparator 4. When said respective resistances in the circuit 15 are designed so that a current $i_2$ flowing through the cable lead 12 is equal to a current $i_1$ flowing through the cable lead 13, a voltage drop developed across the lead 12 is equal to that developed across the lead 13, so that the resistance inherent to the cable leads 12 and 13 do not affect the circuit performance of the circuit of FIG. 1. By comparing a voltage $v_1$ appearing at the terminal 3 with a voltage $v_2$ appearing at the junction 6, the comparator 4 detects that an internal resistance value $R_x$ of the resistance 10 is equal to a resistance value adjusted by the variable resistance 23, viz., the temperature sensed by the resistance 10 is equal to the temperature preset by the resistance 23.

For a satisfactory circuit performance, however, the variable resistance 23 must be able to be precisely adjusted to a desired resistance value. Generally, it is found that a variable resistance which is able to satisfy various requirements, such as low cost, accuracy, linearity, stability, etc., has a relatively low resistance value. Accordingly, when such a variable resistance having a low resistance value is employed as the resistance 23, viz., a maximum change (e.g. 20 ohms) in the resistance value of said variable resistance 23 is smaller than a maximum change (e.g. 200 ohms) in the resistance value of the temperature responsive resistance 10, the current $i_2$ is required to be larger than the current $i_1$ (e.g. ten times) so that a range over which the voltage $v_1$ may be variable coincides with a range over which the voltage $v_2$ is variable. Under the above conditions, the voltage drop across the lead 12 is not equal to that across the lead 13, and the internal resistance value $r_e$ of each of the cable leads 11, 12 and 13 affects the detection accuracy of the circuit shown in FIG. 1.

It is, therefore, a primary object of the present invention to provide a temperature detecting circuit comprising a temperature responsive resistance and a variable resistance for detection temperature presetting, in which the maximum change in the resistance value of the variable resistance is independent of that of the temperature responsive resistance which has sensed a temperature, and the internal resistance value of a cable lead which is determined by its length from the temperature responsive resistance to its associated circuit does not affect the circuit performance of the temperature detecting circuit.

It is a further object of the present invention to provide a temperature detecting circuit which comprises three cable leads connecting the temperature responsive resistance disconnectably to its associated circuit, and a variable resistance which has a low resistance value.

Other objects as well as the numerous advantages of the temperature detecting circuit according to the present invention will become apparent from the following detailed description and the accompanying drawings, in which:

DETAILED DESCRIPTION

Figure 2:
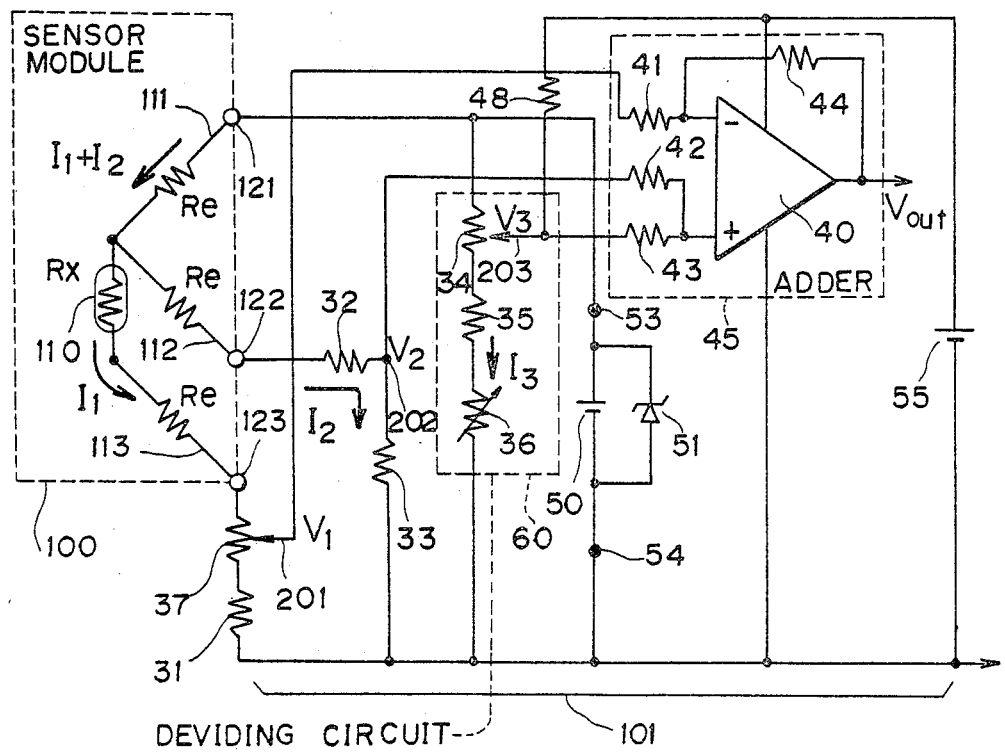
FIG. 2 is a circuit showing a temperature detecting circuit as a preferred embodiment of the present invention.

Referring, now, to FIG. 2, there is shown a temperature detecting circuit as one embodiment of the present invention, in which a three-wire temperature sensor module 100 including a first, a second and a third cable lead 111, 112 and 113 and a temperature responsive resistance 110, e.g., a platinum resistance element, is removably connected to an associated circuit 101 through a first, a second and a third terminal 121, 122 and 123. The three cable leads 111, 112 and 113 each has the same internal resistance value $R_e$ and are connected to the temperature responsive resistance 110 having an internal resistance value $R_X$. The first terminal 121 is connected to a power terminal 53 to which a reference voltage is applied by a voltage source 50 and a zener diode 51 connected in parallel. The terminal 122 is connected to a resistance 32 and a resistance 33. The terminal 123 is connected to a variable resistance 37 having a movable contact 201, and a resistance 31. A potential dividing circuit 60 is connected across terminals 53 and 54, and includes a variable resistance 34 having a movable contact 203 for setting a temperature, a resistance 35 and a variable resistance 36.

An amplifier 40 connected to a voltage source 55, input resistances 41, 42 and 43, and an feed back resistance 44 constitutes an adder 45 which sums a first voltage $V_1$ appearing on the movable contact 201, a second voltage $V_2$ appearing at a junction 202 between the resistances 32 and 33, and a third voltage $V_3$ appearing on the movable contact 203 of the resistance 34. The resistance values of resistances 41, 42, 43 and 44 are identical. The adder 45 is designed to generate an output voltage $V_{out}$ according to the following equation:

$$V_{out} = -V_1 + V_2 + V_3 \qquad \ldots (1)$$

The variable resistance 37 is interposed to compensate for an offset of the amplifier 40 and any variation of voltage source or resistors. Therefore, after the variable resistance 37 was adjusted on assembling the circuit 101, the resistance need not be readjusted for each temperature detection.

The respective resistance values of the resistances 31, 32 and 33 are determined so that when the resistance 110 senses a reference temperature, a current $I_1$ flowing through the resistance 110, the cable lead 113 and the resistances 37 and 31 is equal to a current $I_2$ flowing through the cable lead 112 and resistances 32 and 33. When the current $I_1$ is equal to the current $I_2$, a voltage drop $R_e \times I_1$ developed across the lead 113 is equal to a voltage drop $R_e \times I_2$ developed across the lead 112, so that the voltage drops across the leads 113 and 112 are mutually canceled and may be neglected, for the first and second voltages $V_1$ and $V_2$ are applied to the adder 45 as the input voltage $(-V_1+V_2)$ as shown in the above-mentioned equation (1).

In the present embodiment, the resistance value of the resistance 32 is substantially equal to the resistance value of the resistance 110 at the reference temperature, and the resistance value of the resistance 31 is substantially equal to that of the resistance 33. Further, the resistance values of the resistances 31 and 33, respectively, are much larger than those of the resistances 110 and 32. Accordingly, even if the temperature sensed by the resistance 110 varies over a predetermined temperature range, any change in the resistance value of the resistance 110 is much smaller than the resistance value of the resistance 31, so that the difference between currents $I_1$ and $I_2$ as developed by the change of the resistance value $R_X$ may be disregarded as an error of the temperature detecting circuit.

The potential dividing circuit 60 is designed so that the maximum change of first voltage $V_1$ which corresponds to the maximum change in the resistance value $R_X$ of resistance 110 is equal to the maximum change of the third voltage $V_3$, viz., a variation $\Delta V_1$ of the voltage $V_1$ can be rendered equal to a variation $\Delta V_3$ of the voltage $V_3$. Thus, the resistance values of the resistances 35 and 36 are so determined that the current $I_3$ flowing through the resistance 34 provides a voltage $V_3$ satisfying the following equation:

$$V_{out} = -V_{10} + V_2 + V_{30} = 0 \qquad \ldots (2)$$

where the $V_{out}$ is the output voltage of the amplifier 40, $V_{10}$ represents the voltage $V_1$ which appears when the reference temperature, e.g., 0° C., is sensed by the resistance 110, where its resistance value $R_X = R_{X0}$, and $V_{30}$ represents the voltage $V_3$ which appears when the variable resistance 34 is set to a reference temperature position corresponding to the reference temperature sensed by the resistance 110.

Figure 1:
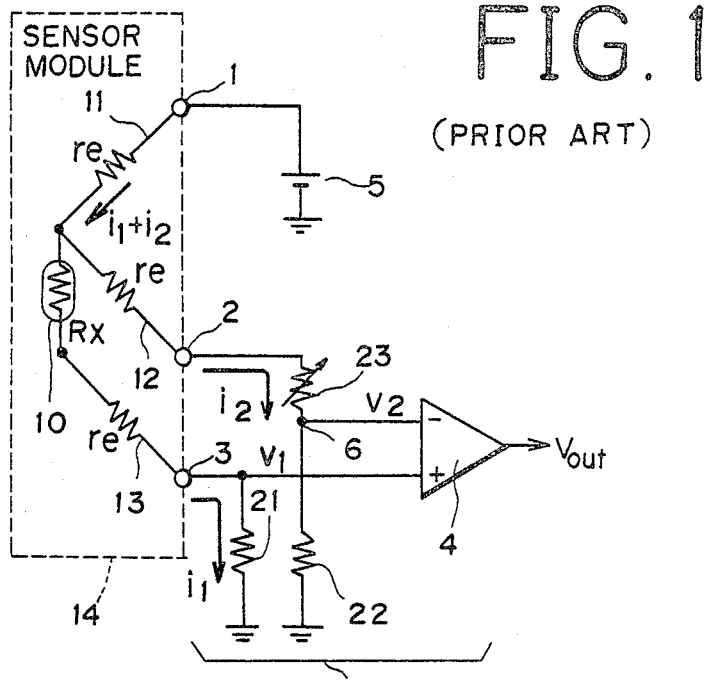
FIG. 1 is a circuit showing a conventional temperature detecting circuit.

Components that may be utilized in the circuit of FIG. 1 and satisfy the foregoing equations (1) and (2) are as follows. It should be noted that the particular resistance values listed below are meant to be only illustrative and the invention is not meant to be limited thereto:

Resistance value $R_X$ (in ohms); 100 at 0° C., 60 at −100° C., 139 at +100° C.

| | |
|---|---|
| Resistance value of resistance | 32 = 100 ohms |
| Resistance value of resistance | 31 ≈ 6 K ohms |
| Resistance value of resistance | 33 ≈ 6 K ohms |
| Resistance value of resistance | 34 = 20 ohms (max.) |
| Resistance value of resistance | 35 ≈ 2 K ohms |
| Resistance value of resistance | 36 = 500 ohms (max.) |

Thus, when the resistance 34 is set to a position corresponding to a desired detection temperature t° C., the following equation applies to the voltage $V_3$:

$$V_3 = V_{30} + \Delta V_3 \qquad \ldots (3)$$

Further, when the temperature responsive resistance 110 senses the temperature t° C. and the resistance value $R_X$ becomes $R_{Xt}$, the following equation applies to the voltage $V_1$:

$$V_1 = V_{10} + \Delta V_1 \qquad \ldots (4)$$

As described above, the variation $\Delta V_3$ is rendered equal to the variation $\Delta V_1$ by means of the circuit 60, so that the above-mentioned equation (1) may be rewritten as follows:

$$\begin{aligned} V_{out} &= -(V_{10} + \Delta V_1) + V_2 + (V_{30} + \Delta V_3) \\ &= -V_{10} + V_2 + V_{30} \\ &= 0 \end{aligned} \qquad (5)$$

The output $V_{out}$ (=0) from the amplifier 40 may be applied to another suitable associated circuit (not shown) so as to indicate that the temperature set by the resistance 34 is equal to the temperature sensed by the resistance 110.

It will be understood from the foregoing that through a mere adjustment of the variable resistance 34, the circuit of FIG. 2 provides a temperature detection independently of both the internal resistances of the cable leads of the temperature sensor module 100 and the difference between the maximum resistance values of the resistances 110 and 34. According to the present embodiment, the terminal 121 is connected to an independent voltage source, other than the voltage source applied to the adder 45, so that the accuracy of temperature detection by the circuit of FIG. 1 is very stable. The variable resistance (34) for presetting a detection temperature may be any conventional variable resistance which has a resistance value lower than that of the temperature responsive resistance.

The above description is only exemplary and many modifications to the described circuit can be made without departing from the spirit and scope of the appended claims.

What is claimed is:

1. A temperature detecting circuit comprising
   a three-wire temperature sensor module including a first, a second and a third terminal, a temperature responsive resistance, a first cable lead connected across said first terminal and one end of said temperature responsive resistance, a second cable lead connected across said second terminal and said one terminal of the temperature responsive resistance, and a third cable lead connected across said third terminal and the other end of said temperature responsive resistance,
   a first and a second power terminal across which a reference voltage is supplied, said first terminal being connected to said first power terminal, a first resistance connected across said third terminal and said second power terminal, a second and a third resistance connected in series across said second terminal and said second power terminal, the respective resistance values of said first, second and third resistances being such that a current flowing through said second cable lead is substantially equal to that of said third cable lead, a potential devider being connected across said first and second power terminals and having a movable contact, and a summing amplifying means for summing a first voltage appearing at a junction between said third terminal and said first resistance, a second voltage appearing at a junction between said second and third resistances and a third voltage appearing on said movable contact of the potential divider and for generating an output signal, said potential devider being designed so that a variation of said third voltage can be rendered equal to a variation of said first voltage corresponding to the resistance value of said temperature responsive resistance sensing a temperature.

2. A temperature detecting circuit according to claim 1, wherein said potential devider includes a variable resistance having a said movable contact, the maximum resistance value of said variable resistance being smaller than that of said temperature responsive resistance.

3. A temperature detecting circuit according to claim 1, wherein said movable contact of the potential devider adjustable so that when a summed value of said second and third voltages is equal to a value of said first voltage, said summing amplifying means generates an output signal at zero voltage level.

4. A temperature detecting circuit according to claim 1, wherein said temperature responsive resistance is a platinum resistance element.

5. A temperature detecting circuit according to claim 1, wherein said reference voltage is independent of a voltage source connected to said summing amplifying means.

6. A temperature detecting circuit according to claim 1, wherein said first resistance has the same resistance value as that of said third resistance, said second resistance has a resistance value equal to the resistance value of said temperature responsive resistance at a reference temperature and said first and second resistance respectively have larger resistance values than those of said temperature responsive and second resistances.

* * * * *